No. 671,265. Patented Apr. 2, 1901.
F. P. COX.
ELECTRIC RECORDING INSTRUMENT.
(Application filed July 9, 1900.)
(No Model.) 2 Sheets—Sheet 1.

Witnesses:
Lewis P. Abell.
Alexander D. Lunt.

Inventor:
Frank P. Cox,
by Albert G. Davis,
Atty.

No. 671,265. Patented Apr. 2, 1901.
F. P. COX.
ELECTRIC RECORDING INSTRUMENT.
(Application filed July 9, 1900.)
(No Model.) 2 Sheets—Sheet 2.

Witnesses:
Lewis E. Abell.
Alexandre S. Lint.

Inventor:
Frank P. Cox,
by Albert G. Davis
Atty.

THE NORRIS PETERS CO., PHOTO-LITHO., WASHINGTON, D. C.

UNITED STATES PATENT OFFICE.

FRANK P. COX, OF LYNN, MASSACHUSETTS, ASSIGNOR TO THE GENERAL ELECTRIC COMPANY, OF NEW YORK.

ELECTRIC RECORDING INSTRUMENT.

SPECIFICATION forming part of Letters Patent No. 671,265, dated April 2, 1901.

Application filed July 9, 1900. Serial No. 22,955. (No model.)

*To all whom it may concern:*

Be it known that I, FRANK P. COX, a citizen of the United States, residing at Lynn, county of Essex, State of Massachusetts, have invented certain new and useful Improvements in Electric Recording Instruments, (Case No. 581,) of which the following is a specification.

My invention relates to recording instruments which operate by drawing curves representing variations in the value of some quantity to be measured—such, for example, as current, voltage, or energy of an electric circuit—and comprises means for eliminating errors due to friction, together with other novel features in construction and mode of application.

In carrying out my invention I make use of an electrodynamometer or similar device the torque of which represents the quantity whose variations are to be recorded. The dynamometer is arranged so as to open and close the circuit of an electric motor which operates when in rotation to oppose the torque of the dynamometer and to actuate the marking member of a recording device.

The construction of an apparatus embodying my invention, together with its mode of operation, will be made clearer by reference to the following description, taken in connection with the accompanying drawings, in which—

Figure 1:
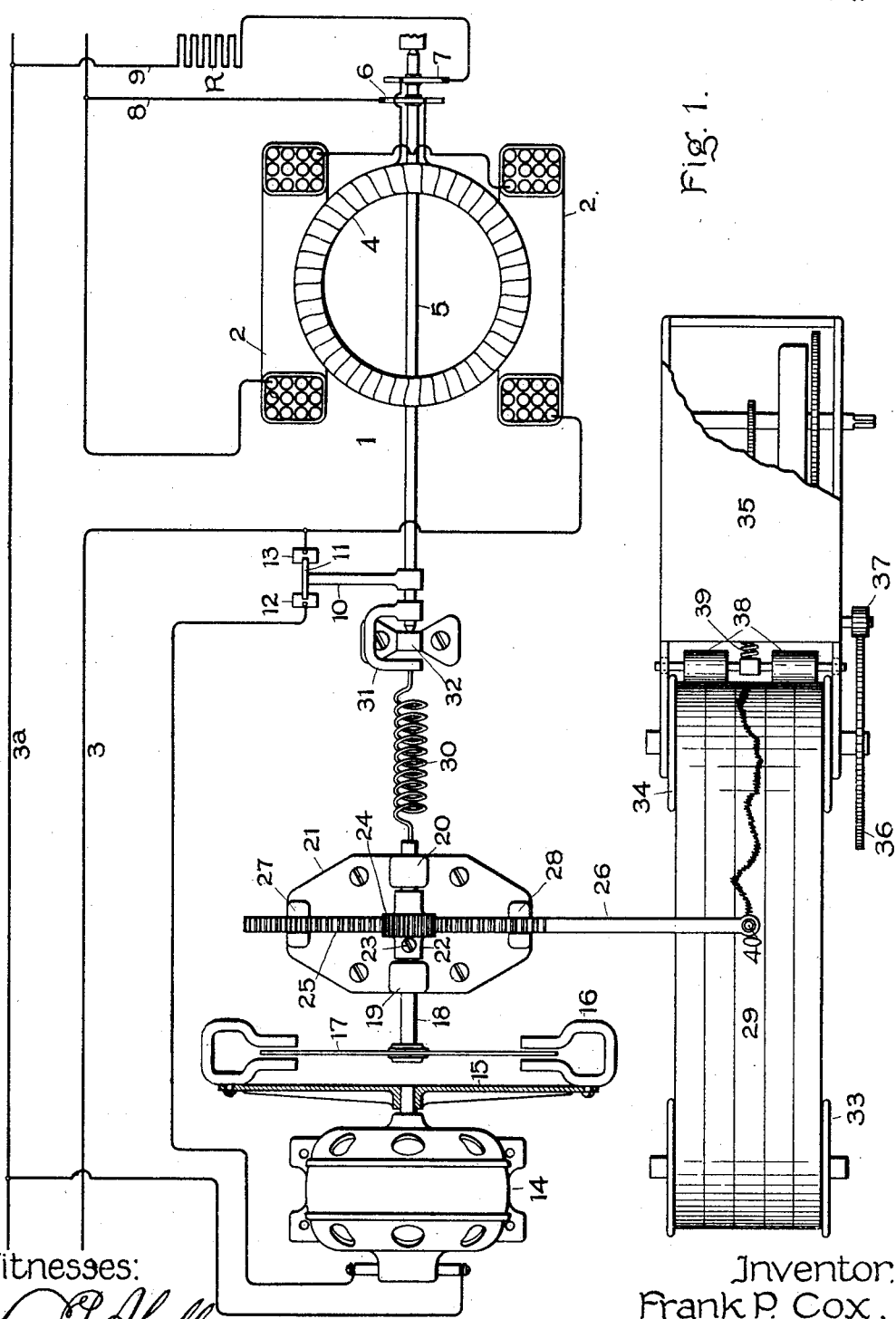
Figure 2:
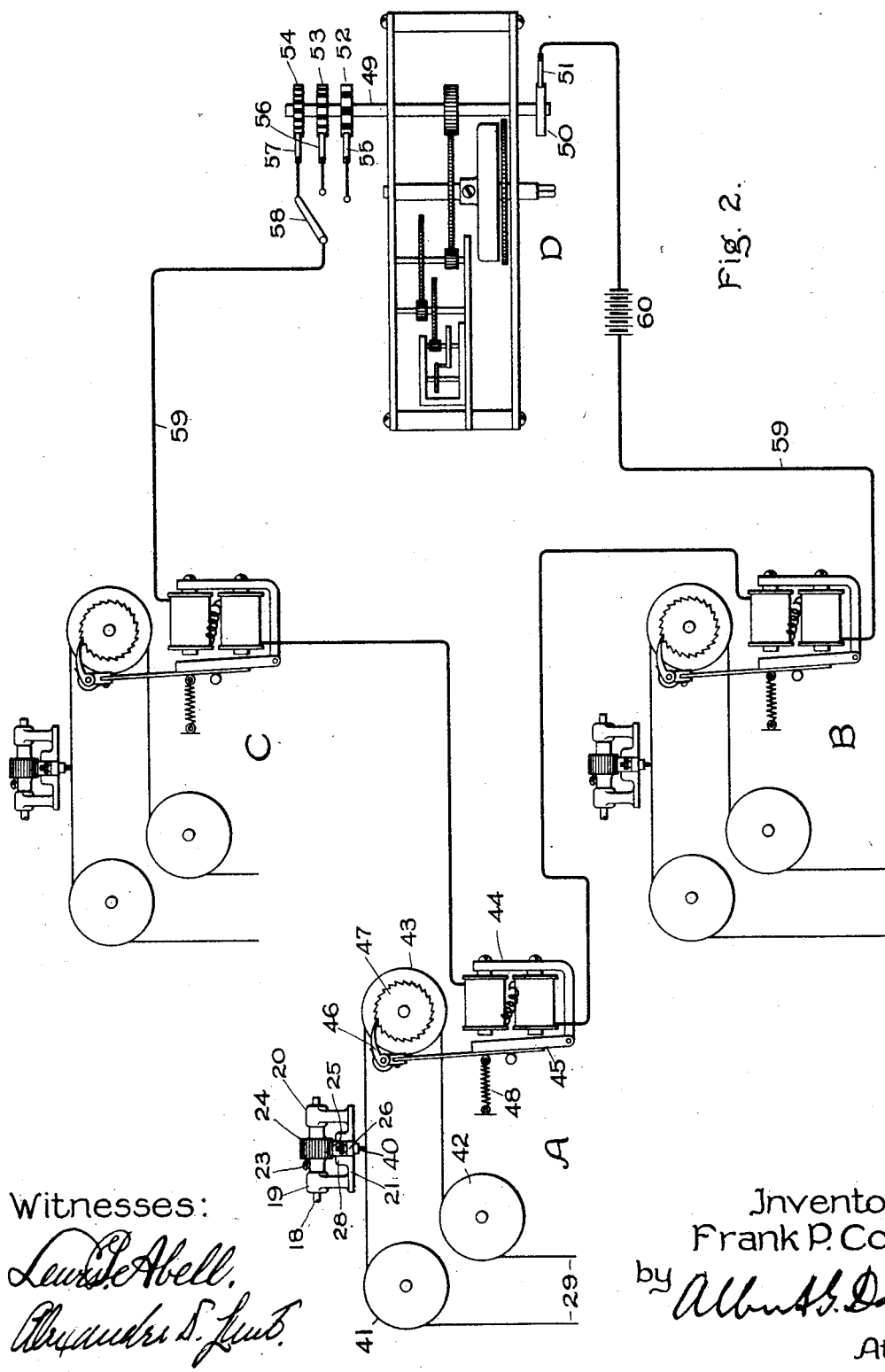

Figure 1 represents one mode of carrying my invention into practice, and Fig. 2 a means for controlling the movement of a number of record-strips from a single point.

In the drawings I have indicated at 1 an electrodynamometer of a type suitable for measuring the energy expended in an electric circuit. It consists of current-coils 2 in series with each other and with the main 3 of the electric circuit in connection with which the recording instrument is to operate. The other member of the dynamometer consists of a coil 4, carried by a suitably-pivoted shaft 5, the terminals of the coil being connected through reversely-wound spiral springs 6 7 to two conductors 8 9, connected in shunt to the mains 3 3ª. To suitably limit the amount of current flowing in this shunt-circuit, I may insert a resistance R, or, if desired, in place of the resistance R the coil 4 itself may be made of sufficiently high resistance to accomplish the purpose sought for.

Carried by the shaft 5 is an arm 10, on the extremity of which is fixed a circuit-closing contact 11, adapted to coöperate with two fixed contacts 12 13, which by being connected together through the agency of the circuit-closing contact 11 closes the circuit of the electric motor 14. This electric motor operates one member of an electromagnetic drag, the other member of which is connected through a coiled spring or similar resilient means to the movable shaft of the dynamometer. In this instance the motor is shown in operative connection to a disk or framework 15, about the periphery of which is secured a suitable number of permanent magnets 16, between the poles of which is located a disk 17, of copper or some other good conducting material. This disk is carried by a rotatable shaft 18, mounted in suitable bearings 19 20, fixed to the base-plate 21. The shaft 18 and the disk 17, carried thereby, are mounted so as to be freely movable relatively to the set of permanent magnets 16, but are prevented from longitudinal movement in any suitable manner—as, for example, by a sleeve 22, placed over the shaft 18 and fitting closely between the bearings 19 and 20. This sleeve is secured to the shaft 18 by means of a set-screw 23 and carries thereon a toothed pinion 24, which engages with a rack 25, constituting a portion of the recording-arm 26. This recording-arm is mounted so as to slide in suitable bearings 27 and 28 and carries at its extremity a pen, pencil, or other marker for making a record on a record-strip 29.

The shaft 18, upon one end of which is mounted the disk 17, is at its other end connected through the coiled spring 30 to a U-shaped extension 31 of the shaft 5 of the electrodynamometer. This shaft is extended by this U-shaped construction in order to pass around the bearing 32, in which is pivoted one end of the said shaft.

The record-strip 29 may consist of paper wound in the form of a roll upon the spool 33 and is drawn therefrom by means of frictional engagement with a cylinder or spool 34, which is rotated by some suitable means— such, for example, as a clockwork mechanism 35—geared thereto through the spur-wheels 36 and 37. The strip 29 is held into frictional engagement with the cylinder 34 by means of tension-rollers 38, urged against the strip by a spring 39 or other suitable means.

When the apparatus thus described is to be put into operation, a clockwork mechanism 35 is started up, so as to set the recording-strip to operation, and current is then sent through the electrodynamometer 1. The connections of the electrodynamometer are made so that when current flows the parts will have a slight relative movement in a direction such as to move the arm 10 and bridge the fixed contacts 12 13, thereby connecting the motor 14 across the mains 3 3ª. The motor then starts up, thereby causing the magnet 16 to rotate relatively to the disk 17, which is thereupon urged forward in the direction of rotation of the motor with a force dependent upon the speed of the motor. As the motor gradually accelerates in speed the power exerted upon the disk 17 becomes greater and greater, this torque being transmitted to the shaft 5 of the electrodynamometer through the coil-spring 30. The motor 14 is arranged to rotate in a direction such that the torque thus exerted is opposed to that of the electrodynamometer. It will thus be seen that the dynamometer tends to keep the circuit of the motor closed by urging the bridging-contact 11 into engagement with the fixed contact 12 and 13, while the motor, by reason of the torque transmitted through the disk 17 and spring 30, tends to move the arm 10, so as to open the circuit at the contacts 12 13. The circuit of the motor being closed, the motor will rise in speed until the torque produced thereby is sufficient not only to overcome the frictional resistance of the marking mechanism, but also to overpower the torque due to the electrodynamometer, whereupon the circuit of the motor will be opened, and the motor will slow down slightly until the torque of the dynamometer again preponderates. The circuit of the motor will then be closed and the operation repeated. This alternate opening and closing of the motor-circuit acts to preserve the motor at a speed such as will balance the torque exerted by the dynamometer and at the same time furnish additional torque to perform the mechanical work of overcoming friction. In operating at this speed the disk 17 will be rotated to an angle proportional to the torque of the dynamometer, thereby rotating the pinion 24 and moving forward the recording-arm 26 by an amount proportional to the torque of the dynamometer, and thereby proportional to the amount of energy acting in the circuit 3 3ª. The pencil 40 or other marking device bears upon the recording-strip 29, and as the strip is drawn along by means of the clockwork mechanism it draws a line which represents the variation from moment to moment of the quantity measured. It will be evident that the electrodynamometer instead of measuring the energy of a current as expressed in watts may, if desired, be modified so as to measure either current or electromotive force.

Where more than one recording instrument is employed, the paper-feeding mechanism of the several instruments may be controlled from a single clock mechanism located at some central point. In this case each feeding mechanism may be provided with electromagnetic actuating means operated by means of electric impulses controlled by the clock. In this way simultaneous operation of the paper or other record-strips may be secured, and in many cases this is a most desirable feature.

Fig. 2 of the drawings illustrates in a general way an arrangement suitable for carrying out the mode of operation just described. At A B C are shown, respectively, the paper-feeding-mechanisms of as many recording instruments. As these feeding mechanisms are alike in the several cases a description of one will suffice for all. In the mechanism A the paper or other record strip is indicated at 29, this paper passing over rolls 41 42 and around a roll 43. The recording-arm 26 carries a marking device, which bears upon the record-strip 29 in the same manner as shown in Fig. 1. Instead, however, of moving the record-strip by means of a clock, as in Fig. 1, I make use of an electromagnet 44, having a pivoted armature 45, one end of which carries a pawl 46, engaging with a ratchet-wheel 47 on the shaft of the roller 43. When current is sent through the winding of the magnet, the armature 45 is attracted and, by means of the ratchet and pawl operatively connected thereto, causes the roller 43 to be rotated through a limited arc. Upon interruption of the current a spring 48 draws back the armature 45 into position ready for another advance movement.

In order to control the periodic supply of current to the several magnets of the various recording instruments, I make use of a clock mechanism D of any appropriate construction. In the present instance this clock mechanism operates to rotate a shaft 49, carrying at one end a disk 50 and coöperating brush 51 and at the other end a series of disks 52 53 54, each having alternate conducting and non-conducting portions. Brushes 55 56 57 bear, respectively, upon the disks 52 to 54. These disks differ from each other in that the number of conducting portions differ, whereby the number of makes and breaks of a circuit may be varied by connecting in one or another of the disks. For this purpose a switch 58 may be employed. A series circuit 59 makes connection at one end with the brush 51, at the other end with the switch 58, and includes in series a source of current—such, for example, as a battery 60—together with the actuating-magnets of the different recording instruments. As the shaft 49 is gradually revolved by the clock mechanism current impulses are sent out along the line 59, causing thereby simultaneous movements of the feeding mechanisms of the different recording instruments. The number of impulses may be varied by shifting the switch 58 so as to include in circuit the contact-disk most appropriate for the purpose.

It is obvious that my invention is capable of many modifications and adaptations without departing from the spirit of the same, for which reason I do not wish to be limited to the particular constructions shown.

What I claim as new, and desire to secure by Letters Patent of the United States, is—

1. The combination of an electrodynamometer, a shaft or other rotatable body resiliently connected to the electrodynamometer, a motor and a magnetic drag device in operative relation between said motor and said shaft or other body.

2. The combination of an electrodynamometer, a shaft or other rotatable body resiliently connected to the electrodynamometer, a motor, a magnetic drag device in operative relation between said motor and said shaft or other body, and means for drawing a curve representing the variation in angular displacement of said shaft or body.

3. The combination of an electrodynamometer, a shaft resiliently connected to the electrodynamometer, a conducting-disk carried by the shaft, magnets in inductive and movable relation to the disk, and a motor for moving said magnets.

4. The combination of an electrodynamometer, an electric motor, a shaft resiliently connected to the dynamometer and having a slipping connection with the motor, and means for recording the rotation of said shaft.

5. The combination of a marking device, a motor, a slipping connection between the motor and marking device, and means for opposing motion of the marking device with a force proportional to the value of some quantity to be measured.

6. The combination of a marking device, a motor, a magnetic drag device in operative relation between the motor and marking device, and means for opposing motion of the marking device with a force proportional to the value of some quantity to be measured.

7. The combination of a marking device, a motor and a slipping connection between the motor and the marking device.

8. The combination of recording means, a motor, and magnetic means for establishing between the motor and the recording means a torque which varies with the speed of the motor.

9. The combination of a marking device, an electrodynamometer resiliently connected to the marking device, a motor, and a slipping connection in operative relation between the motor and marking device.

10. The combination of a marking device, an electrodynamometer resiliently connected to the marking device, a motor, a slipping connection in operative relation between the motor and marking device, and a circuit-closing device for the motor controlled by the electrodynamometer.

11. The combination of a recording-surface, means for imparting to said recording-surface a step-by-step movement, and means for varying the speed of such movement.

12. The combination of a plurality of recording-surfaces, means for imparting to said surfaces simultaneous step-by-step movements, and means for varying the speed of such movements.

In witness whereof I have hereunto set my hand this 6th day of July, 1900.

FRANK P. COX.

Witnesses:
ALEX F. MACDONALD,
BENJAMIN B. HULL.